United States Patent
Zhang et al.

(10) Patent No.: US 8,342,601 B2
(45) Date of Patent: Jan. 1, 2013

(54) ROOF FOR A RECREATIONAL VEHICLE

(75) Inventors: Liufeng Zhang, Guangxi (CN); Jianshe Chen, Guangxi (CN); Changping Liang, Guangxi (CN); Wenwen Liu, Guangxi (CN); Ping Li, Guangxi (CN)

(73) Assignee: Liuzhou Wuling Motors Co., Ltd. (CN)

( * ) Notice: Subject to any disclaimer, the term of this patent is extended or adjusted under 35 U.S.C. 154(b) by 0 days.

(21) Appl. No.: 13/166,206

(22) Filed: Jun. 22, 2011

(65) Prior Publication Data

US 2012/0139298 A1 Jun. 7, 2012

(30) Foreign Application Priority Data

Dec. 3, 2010 (CN) ...................... 2010 2 0640997 U

(51) Int. Cl.
*B62D 25/06* (2006.01)
(52) U.S. Cl. ....................................................... 296/210
(58) Field of Classification Search .................. 296/210, 296/213, 107.04
See application file for complete search history.

(56) References Cited

U.S. PATENT DOCUMENTS

| | | | | |
|---|---|---|---|---|
| 3,118,701 | A * | 1/1964 | Peras | 296/93 |
| 4,487,449 | A * | 12/1984 | Igel et al. | 296/216.07 |
| 4,492,405 | A * | 1/1985 | Chikaraishi et al. | 296/146.9 |
| 4,925,237 | A * | 5/1990 | Bohn et al. | 296/216.09 |
| 5,050,928 | A * | 9/1991 | Bohm et al. | 296/216.09 |
| 5,950,366 | A * | 9/1999 | Uhlmeyer | 49/484.1 |
| 6,378,936 | B1 * | 4/2002 | Grimm et al. | 296/214 |
| 7,029,060 | B1 * | 4/2006 | Osterberg et al. | 296/203.03 |
| 7,604,287 | B2 * | 10/2009 | Mourou | 296/210 |

* cited by examiner

*Primary Examiner* — H Gutman
(74) *Attorney, Agent, or Firm* — Cantor Colburn LLP

(57) ABSTRACT

A roof for a recreational vehicle may include a roof frame made by bending circular tubes and a roof plate. The roof plate is connected to the roof frame via a roof plate sealing rubber strip and a frame sealing rubber strip. The roof plate sealing rubber strip covers the peripheral edge of the roof plate through a groove formed at one side of the roof plate sealing rubber strip, and the other side of the roof plate sealing rubber strip is inserted into a slot of the top of the frame sealing rubber strip and is clamped by lips on both sides of the slot, and the frame sealing rubber strip is adhered onto the roof frame.

4 Claims, 1 Drawing Sheet

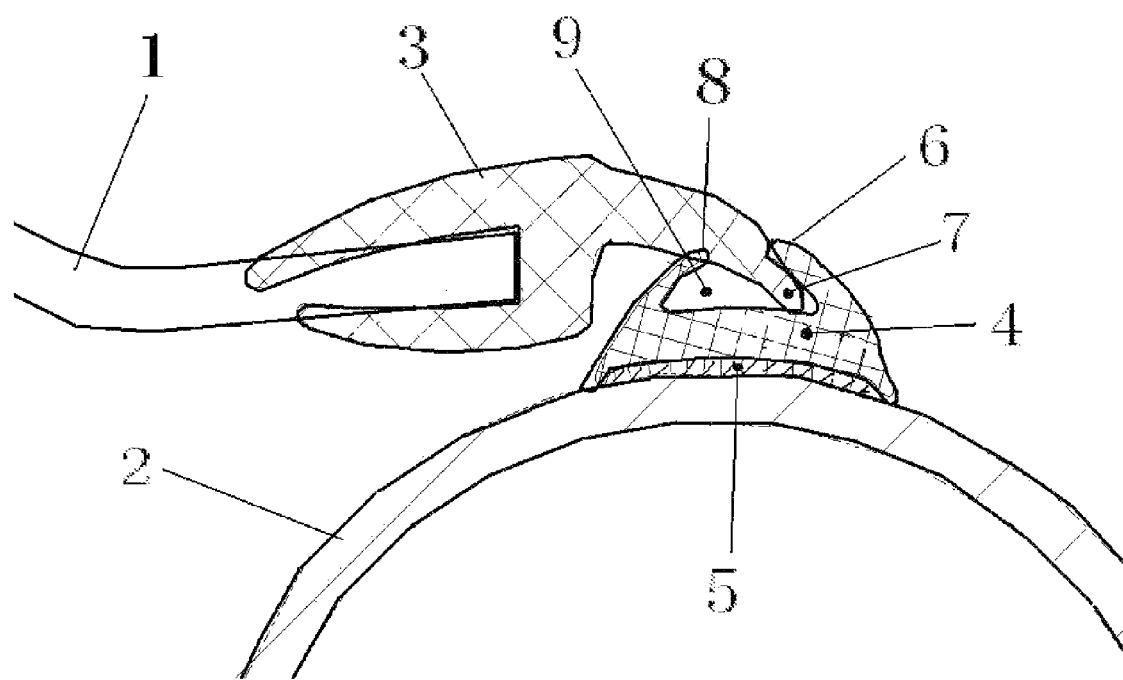

ROOF FOR A RECREATIONAL VEHICLE

The present application claims the benefit of priority to Chinese utility model application No. 201020640997.4 titled "ROOF FOR A RECREATIONAL VEHICLE", filed with the Chinese State Intellectual Property Office on Dec. 3, 2010. The entire disclosure thereof is incorporated herein by reference.

TECHNICAL FIELD

The present invention relates to vehicle manufacturing technologies, particular to a roof with a roof frame being of a circular tube structure for a recreational vehicle.

BACKGROUND

Usually, a frame of a roof of a recreational vehicle is made by bending circular tubes, and the connection between such frame and a roof plate of the vehicle enables the edges of the roof plate of the vehicle to extend out of the frame of a vehicle body, so as to form a "hanging eave" structure for preventing rain from directly falling into the vehicle, but this structure is unable to highlight the modeling features of the vehicle frame. However, there generally is a relatively high artistic requirement about the appearance modeling for the recreational vehicle, and further, the modeling of the roof frame of the vehicle is one of the important parts of the vehicle appearance. If the roof frame of the vehicle needs to be highlighted, the conventional roof of the recreational vehicle described above is not applicable; and if the conventional roof plate of the vehicle is shortened to the roof frame, a rainproof problem will arise.

BRIEF SUMMARY

The invention provides a roof of a recreational vehicle, which can solve the problem that the roof frame made of circular tubes and the roof plate of the vehicle are not flushed with each other and the problem of the leakage of the rain.

To solve the above mentioned problems, the roof of the recreational vehicle according to the present invention includes a roof frame made by bending circular tubes and a roof plate. The roof plate is connected to the roof frame via a roof plate sealing rubber strip and a frame sealing rubber strip. The roof plate sealing rubber strip covers the peripheral edge of the roof plate through a groove formed at one side of the roof plate sealing rubber strip, and the other side of the roof plate sealing rubber strip is inserted into a slot of the top of the frame sealing rubber strip and is clamped by lips on both sides of the slot. The frame sealing rubber strip is adhered onto the roof frame.

In the above technical solution, a drain channel is preferably provided in the slot of the top of the frame sealing rubber strip, so that water penetrated inside the top slot flows along the drain channel to the outside, which may prevent the penetrated water from overflowing the top slot to leak into the roof of the recreational vehicle. The roof plate sealing rubber strip is generally made of compacted and solid rubber material with relatively high strength, and the frame sealing rubber strip is generally made of softer foaming sponge rubber material. The undersurface of the frame sealing rubber strip may be provided with a shallow slot in which double-side foam adhering layer is filled. The frame sealing rubber strip may be adhered onto the roof frame through the double-side foam adhering layer.

Compared with the prior art, the present invention using the above technical solution has following beneficial effects.

1. The present invention may solve the problem that the roof frame made of circular tubes and the roof plate are not flushed with each other and not aesthetic, and prevent rain from leaking in the roof
2. Since the frame sealing rubber strip is made of softer foaming material, it not only has a sealing function but also eliminate the assembly error between the roof plate sealing rubber strip and the roof frame with its deformability, thereby reducing the difficulties of manufacture and assembly.
3. The present invention has smaller structural dimensions, simpler connection structure, and lower manufacturing cost.

BRIEF DESCRIPTION OF DRAWING

FIG. 1 is a structural schematic view of the connection between a roof frame and a roof plate according to the present invention.

DETAILED DESCRIPTION

The present invention will be further described in detail in conjunction with drawings and embodiments as follows.

As shown in FIG. 1, a roof plate sealing rubber strip 3 is made of compacted and solid rubber material. The roof plate sealing rubber strip 3 is provided with a groove formed by two lips at one side thereof, through which the peripheral edge of the roof plate 1 is covered. A frame sealing rubber strip 4 is made of foaming sponge rubber material and is provided on its bottom surface with a double-side foaming sponge adhering layer 5 which is adhered and fixed onto the roof frame 2. A single lip 7 is provided at one side of the roof plate sealing rubber strip 3 opposite to the groove thereof A top slot formed by two lips 6, 8 is provided on the top of the frame sealing rubber strip 4, and the single lip 7 of the roof plate sealing rubber strip 3 is inserted into the top slot of the frame sealing rubber strip 4. The lip 6 abuts against the single lip 7 to form an enclosed structure so as to form a first water-proof line. The lip 8 abuts against the undersurface of the single lip 7 so as to form a second water-proof line. The space between the first water-proof line and the second water-proof line forms a drain channel 9. If water penetrates through the first water-proof line, the penetrated water can flow away along the drain channel 9, thereby preventing the penetrated water from overflowing the second water-proof line to leak into the roof The frame sealing rubber strip 4 has a sealing function, and further can eliminate the assembly error between the roof plate sealing rubber strip 3 and the roof frame 2. Due to the low cost of a recreational vehicle and the relatively low precision of the components and the assembly, the assembly error is big. If the sealing rubber strip 4 is not used, assembly clearance is prone to be presented between the sealing rubber strip 3 and the roof frame 2, which is neither beautiful nor water-proof The use of the frame sealing rubber strip 4 may completely solve the problem of assembly clearance and leakage of water.

The roof of the recreational vehicle may be assembled by the following steps:

1. fitting the roof plate sealing rubber strip 3 around the peripheral edge of the roof plate 1;
2. fixing the roof plate 1 onto the vehicle body with screws;
3. inlaying the frame sealing rubber strip 4 into the space between the roof plate sealing rubber strip 3 and the roof frame 2, and determining an assembly location;

4. tearing a protective film of the double-side foaming sponge adhering layer 5 from a starting end of the frame sealing rubber strip 4 with specialized tools, and adhering the frame sealing rubber strip 4 onto the roof frame 2.

What is claimed is:

1. A recreational vehicle roof, comprising a roof frame and a roof plate, wherein the roof plate is connected to the roof frame via a roof plate sealing rubber strip and a frame sealing rubber strip; the roof plate sealing rubber strip covers a peripheral edge of the roof plate through a groove formed at one side of the roof plate sealing rubber strip, and the other side of the roof plate sealing rubber strip is inserted into a slot of the top of the frame sealing rubber strip and is clamped by lips on both sides of the slot, and the frame sealing rubber strip is adhered onto the roof frame.

2. The recreational vehicle roof according to claim 1, wherein a drain channel is provided in the slot of the top of the frame sealing rubber strip.

3. The recreational vehicle roof according to claim 1, wherein the roof plate sealing rubber strip is made of compacted rubber material, the frame sealing rubber strip is made of foaming sponge rubber material, and the middle of a undersurface of the frame sealing rubber strip is adhered onto the roof frame with a double-side foaming sponge adhering layer.

4. The recreational vehicle roof according to claim 2, wherein the roof plate sealing rubber strip is made of compacted rubber material, the frame sealing rubber strip is made of foaming sponge rubber material, and the middle of a undersurface of the frame sealing rubber strip is adhered onto the roof frame with a double-side foaming sponge adhering layer.

* * * * *